(12) United States Patent
Shin et al.

(10) Patent No.: US 10,701,714 B2
(45) Date of Patent: Jun. 30, 2020

(54) METHOD FOR PERFORMING DEVICE-TO-DEVICE COMMUNICATION IN WIRELESS COMMUNICATION SYSTEM, AND APPARATUS FOR SAME

(71) Applicant: LG ELECTRONICS INC., Seoul (KR)

(72) Inventors: Seokmin Shin, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/556,950

(22) PCT Filed: Mar. 17, 2016

(86) PCT No.: PCT/KR2016/002677
§ 371 (c)(1),
(2) Date: Sep. 8, 2017

(87) PCT Pub. No.: WO2016/148517
PCT Pub. Date: Sep. 22, 2016

(65) Prior Publication Data
US 2018/0070371 A1    Mar. 8, 2018

Related U.S. Application Data

(60) Provisional application No. 62/135,673, filed on Mar. 19, 2015.

(51) Int. Cl.
*H04W 72/12* (2009.01)
*H04W 76/10* (2018.01)
(Continued)

(52) U.S. Cl.
CPC ........... *H04W 72/1242* (2013.01); *H04L 5/00* (2013.01); *H04L 5/0044* (2013.01);
(Continued)

(58) Field of Classification Search
CPC ......... H04W 72/1242; H04W 56/0015; H04W 76/14; H04W 72/0406; H04W 76/10;
(Continued)

(56) References Cited

U.S. PATENT DOCUMENTS

| 2014/0328329 A1 | 11/2014 | Novlan et al. |
| 2015/0029866 A1 | 1/2015 | Liao et al. |

(Continued)

FOREIGN PATENT DOCUMENTS

| WO | WO 2015/020375 A1 | 2/2015 |
| WO | WO 2015/021185 A1 | 2/2015 |

OTHER PUBLICATIONS

Ericsson, "Introduction of ProSe", R2-150717, 3GPP TSG-RAN WG2 Meeting #89, Athens, Greece, Feb. 10-14, 2015, pp. 17-28.

*Primary Examiner* — Hassan A Phillips
*Assistant Examiner* — Mohammed S Chowdhury
(74) *Attorney, Agent, or Firm* — Birch, Stewart, Kolasch & Birch, LLP

(57) ABSTRACT

The present specification relates to a method for efficiently managing a D2D sidelink process using D2D data priority. The method, which is performed by a D2D receiving device, comprising: from a D2D transmitting device, receiving, through a sidelink physical channel, scheduling assignment (SA) including information regarding transmission of D2D data; receiving, from the D2D transmitting device, the D2D data on the basis of the received scheduling assignment (SA); and performing a sidelink process with respect to the received D2D data.

4 Claims, 15 Drawing Sheets

(51) Int. Cl.
  *H04W 72/14* (2009.01)
  *H04L 5/00* (2006.01)
  *H04W 92/16* (2009.01)
  *H04W 76/14* (2018.01)
  *H04W 56/00* (2009.01)
  *H04W 72/04* (2009.01)
  *H04W 28/06* (2009.01)
  *H04W 72/08* (2009.01)

(52) U.S. Cl.
  CPC ....... *H04L 5/0053* (2013.01); *H04W 56/0015* (2013.01); *H04W 72/0406* (2013.01); *H04W 72/14* (2013.01); *H04W 76/10* (2018.02); *H04W 76/14* (2018.02); *H04W 92/16* (2013.01); *H04W 28/06* (2013.01); *H04W 72/082* (2013.01); *H04W 72/1226* (2013.01)

(58) Field of Classification Search
  CPC ............. H04W 72/14; H04W 72/1226; H04W 72/082; H04W 28/06; H04L 5/00
  USPC .......................................................... 370/336
  See application file for complete search history.

(56) References Cited

U.S. PATENT DOCUMENTS

| | | | |
|---|---|---|---|
| 2015/0327195 A1* | 11/2015 | Chiu | H04W 56/002 370/350 |
| 2016/0183276 A1* | 6/2016 | Marinier | H04W 72/02 370/329 |
| 2017/0041942 A1* | 2/2017 | Wallentin | H04W 72/1289 |
| 2017/0196030 A1* | 7/2017 | Ma | H04W 72/04 |
| 2017/0230939 A1* | 8/2017 | Rudolf | H04W 72/04 |
| 2017/0257876 A1* | 9/2017 | Loehr | H04L 5/0044 |
| 2019/0239193 A1* | 8/2019 | Rudolf | H04L 12/1863 |

* cited by examiner

[Figure 1]
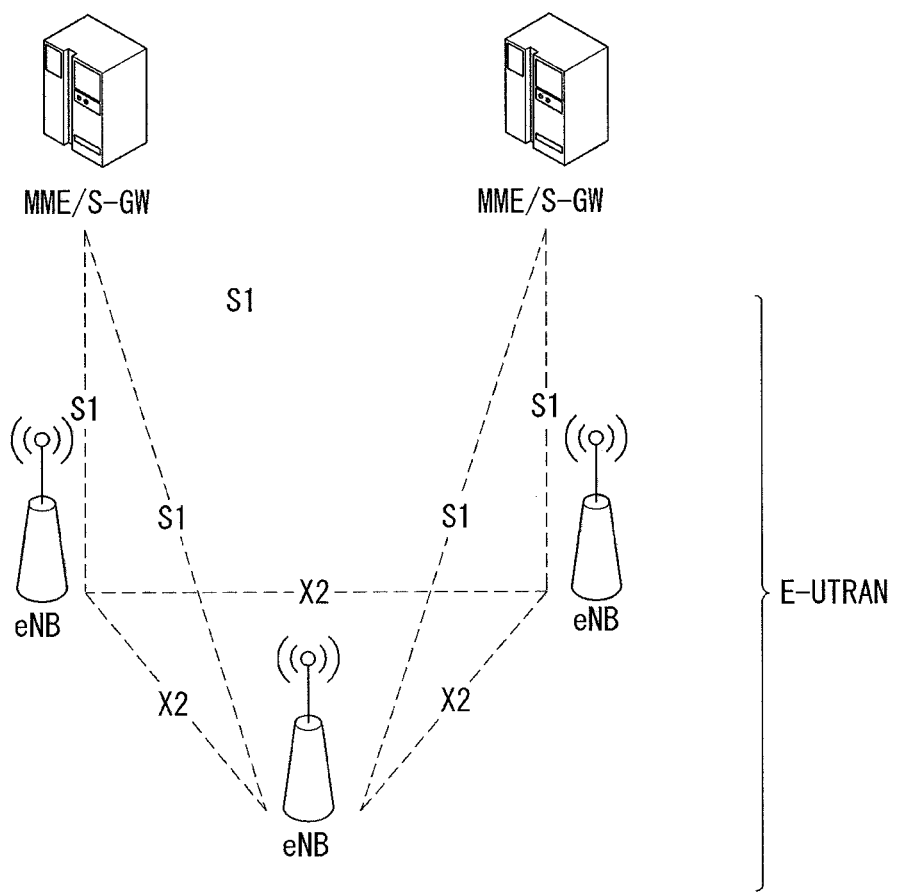

[Figure 2]
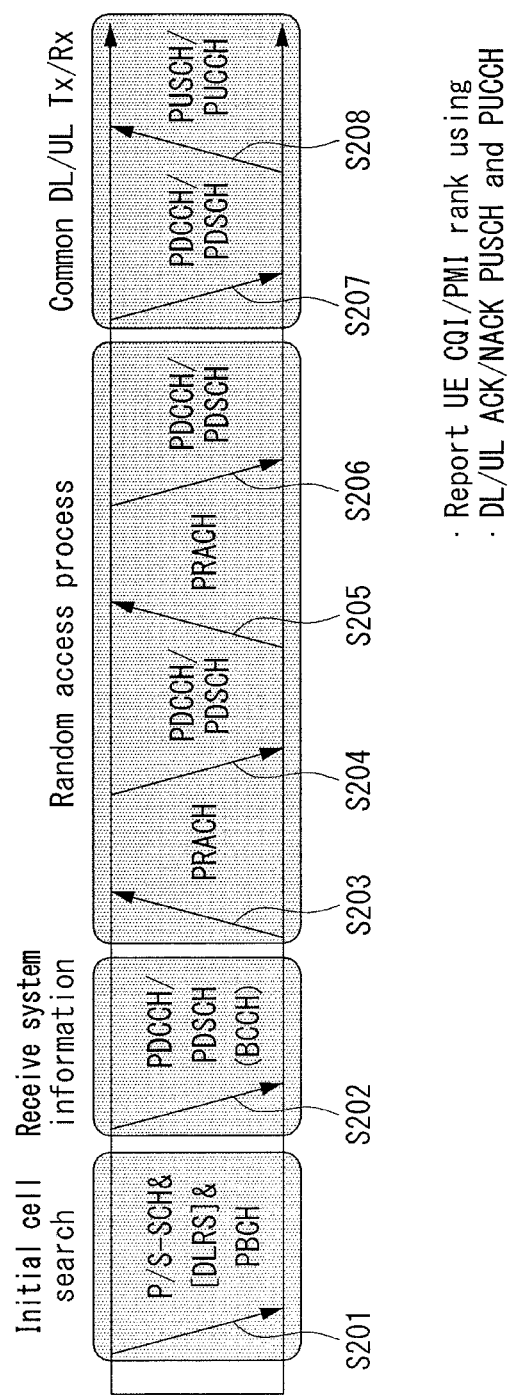

【Figure 3】
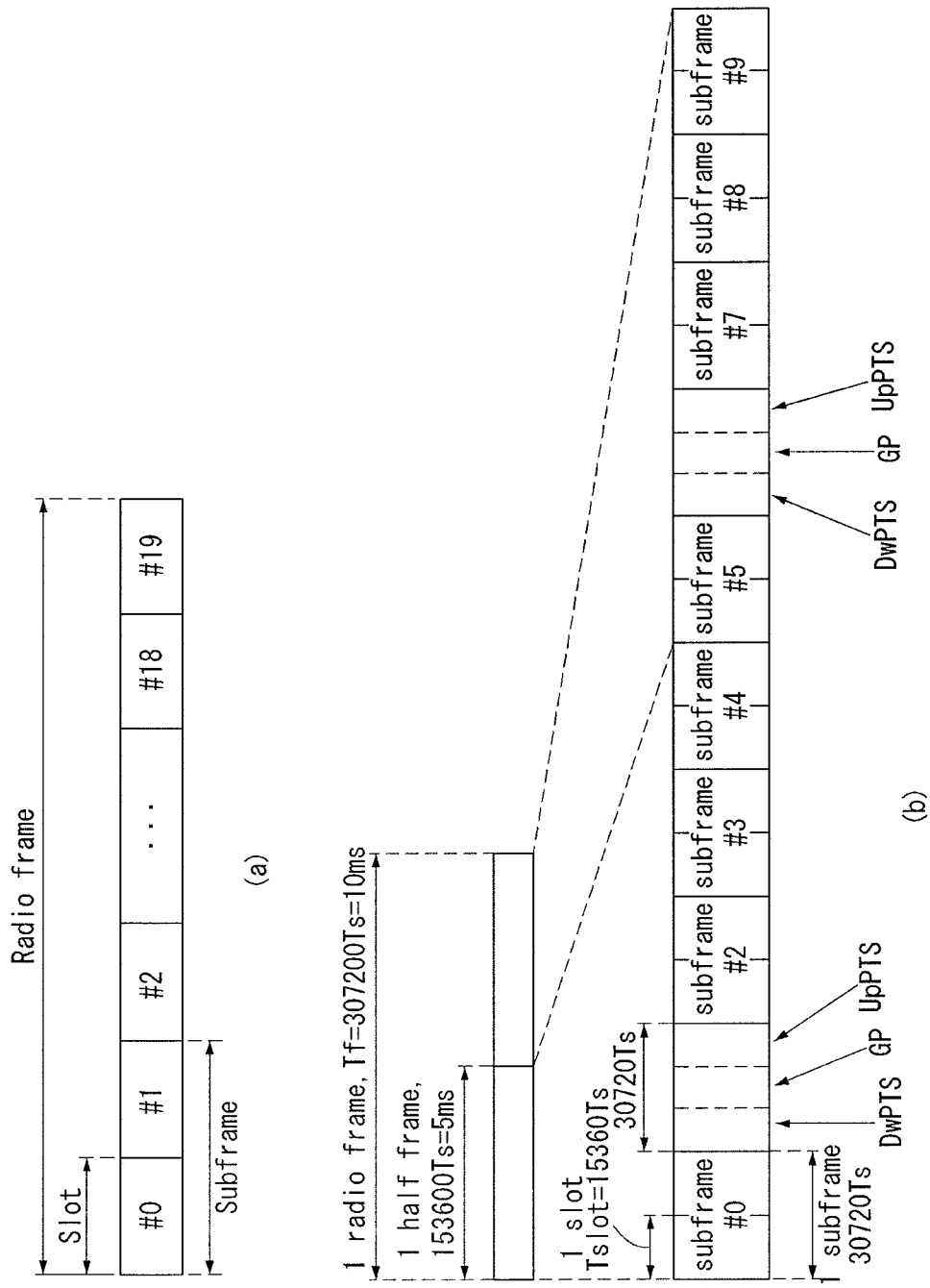

【Figure 4】
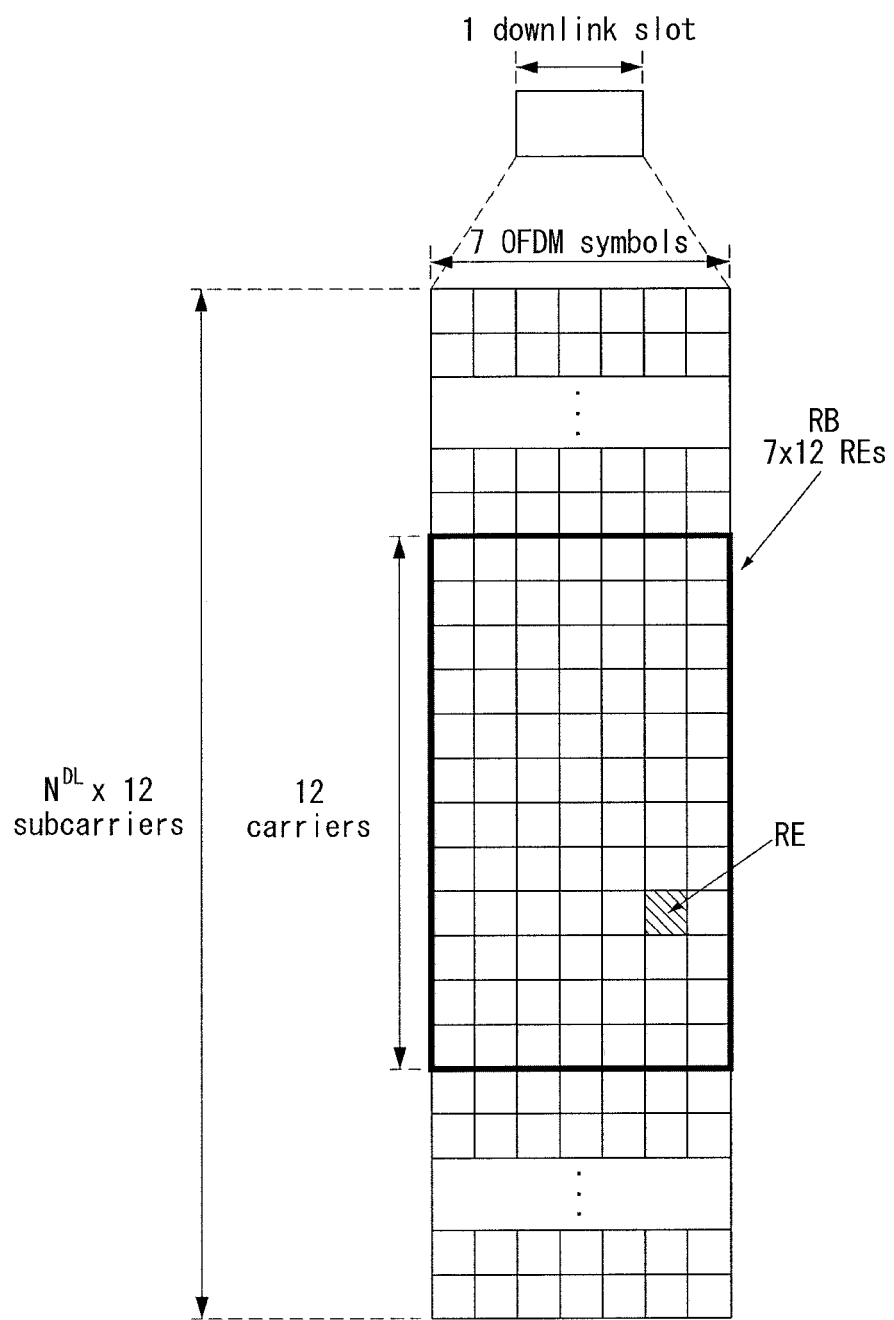

[Figure 5]
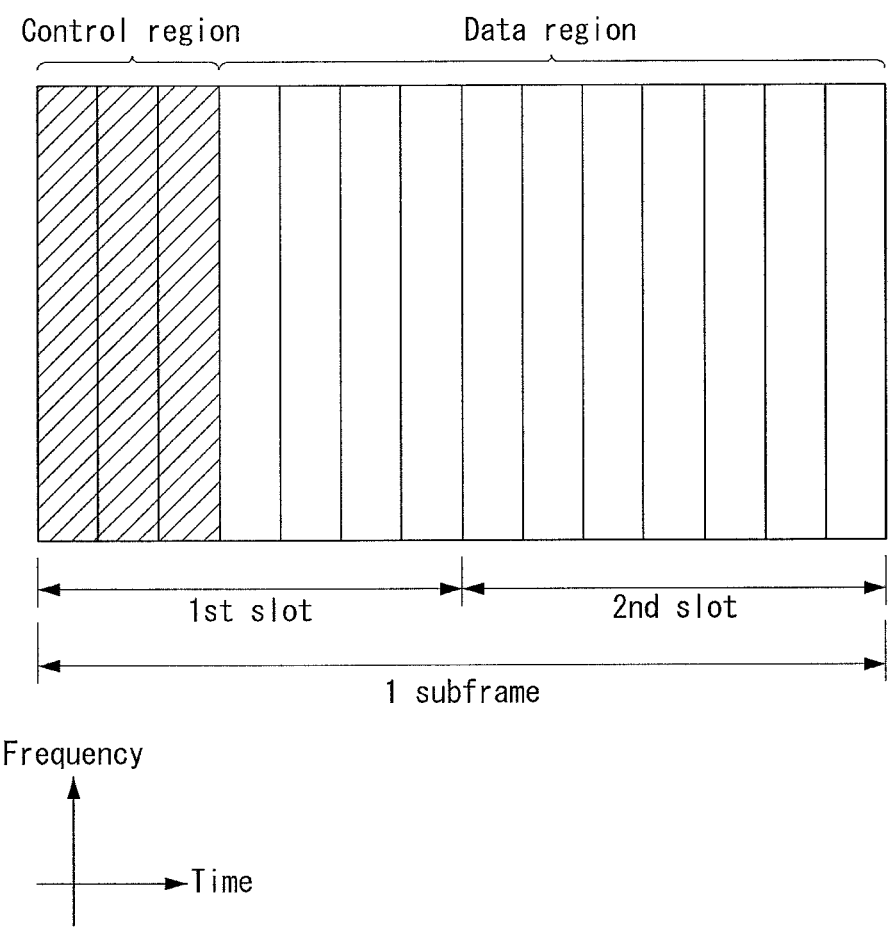

[Figure 6]
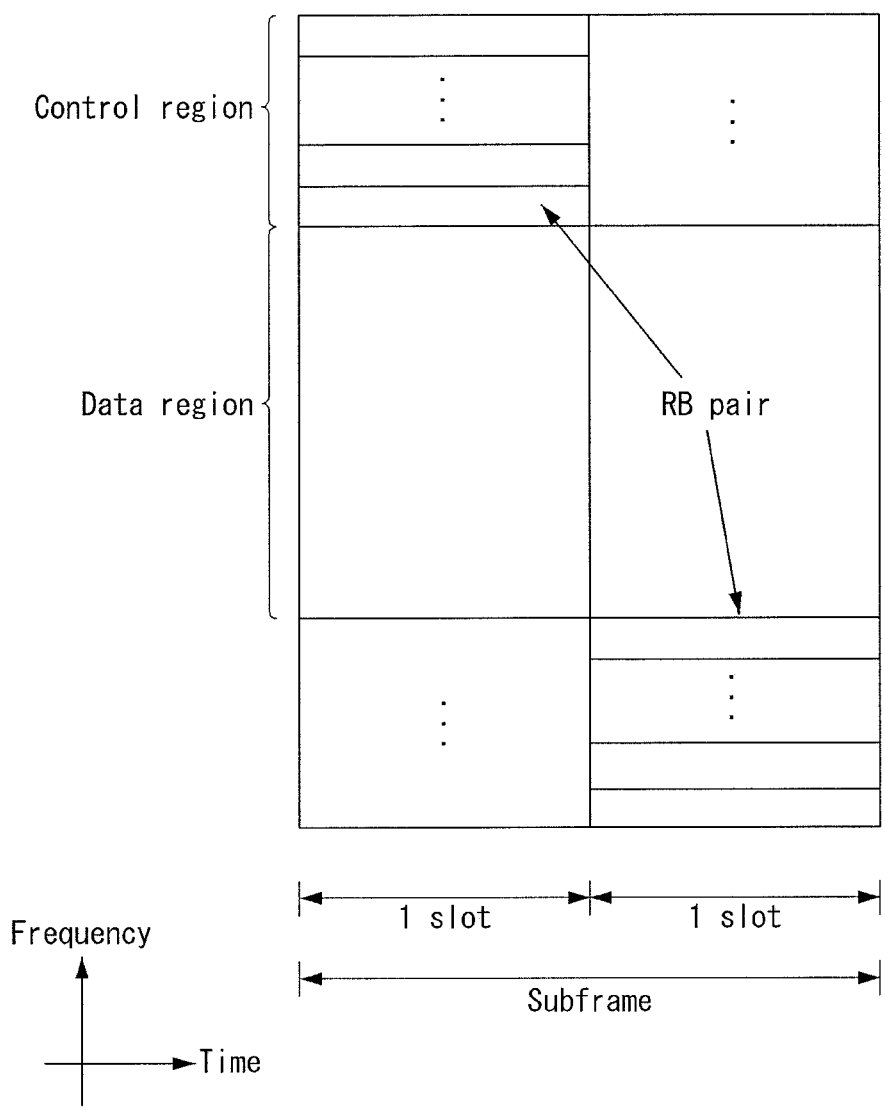

【Figure 7】
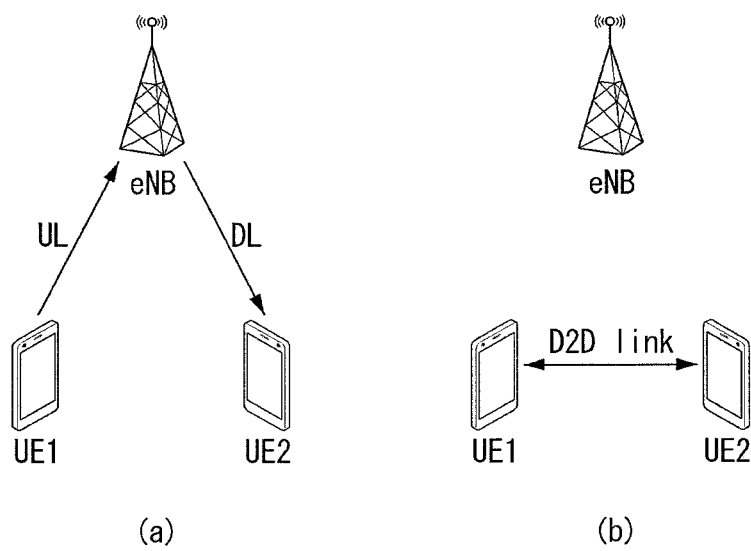

[Figure 8]
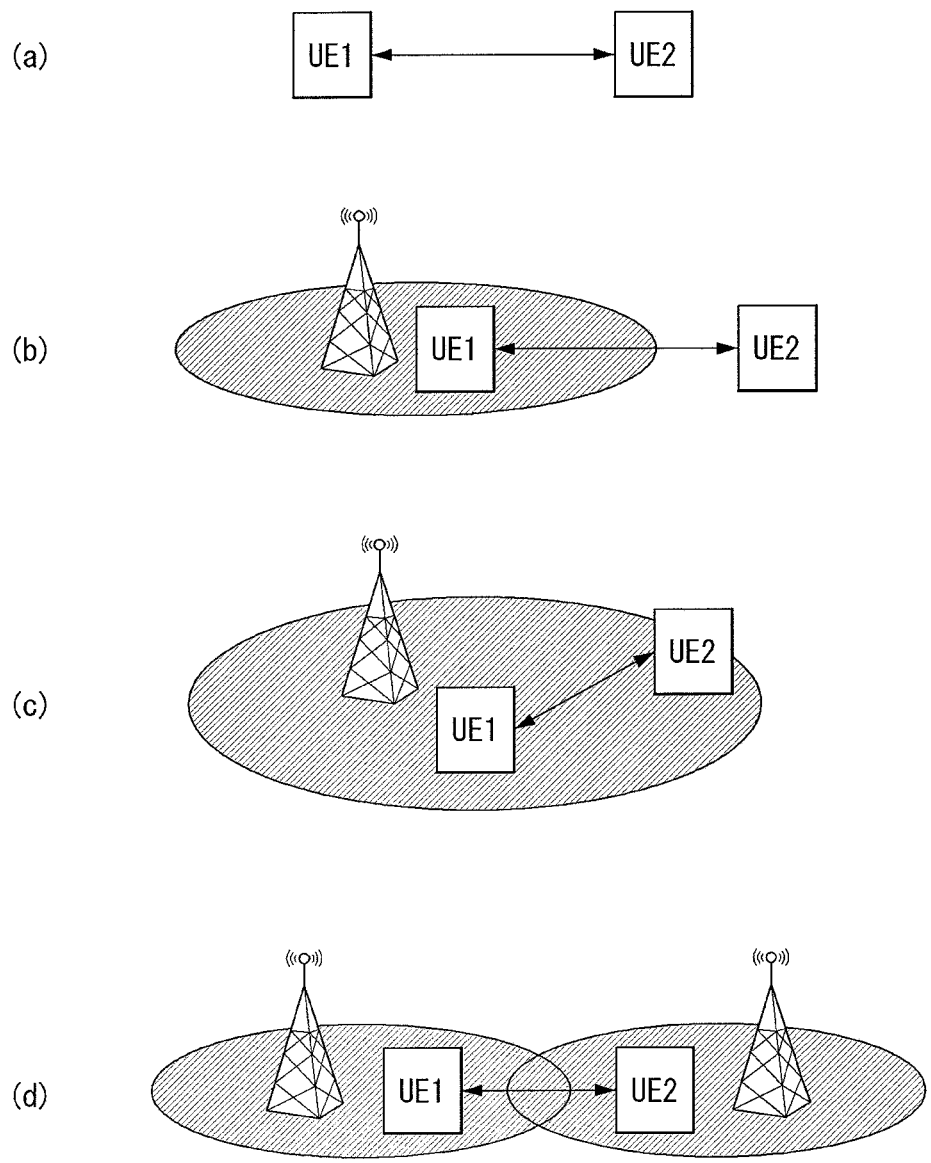

[Figure 9]
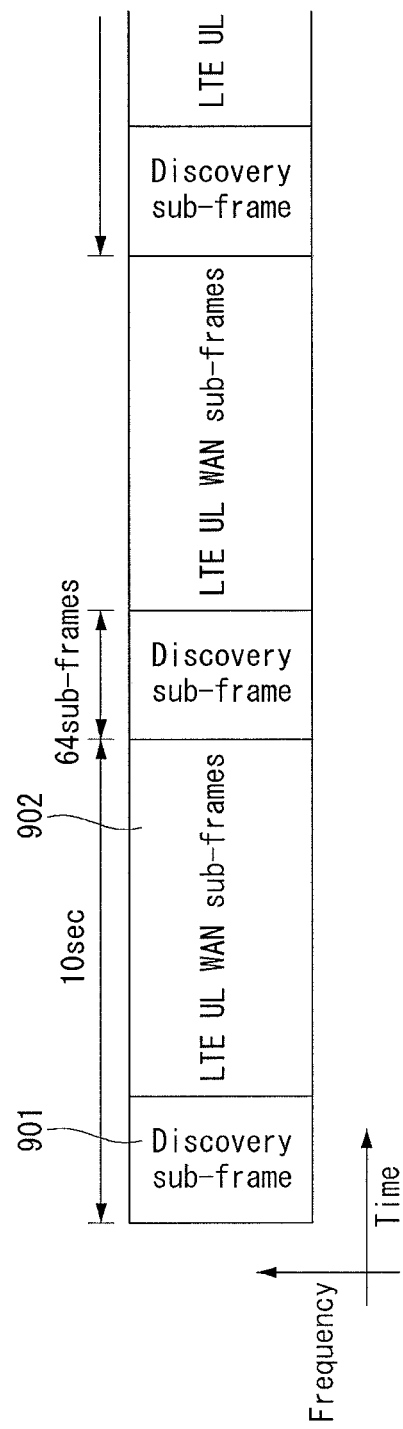

[Figure 10]
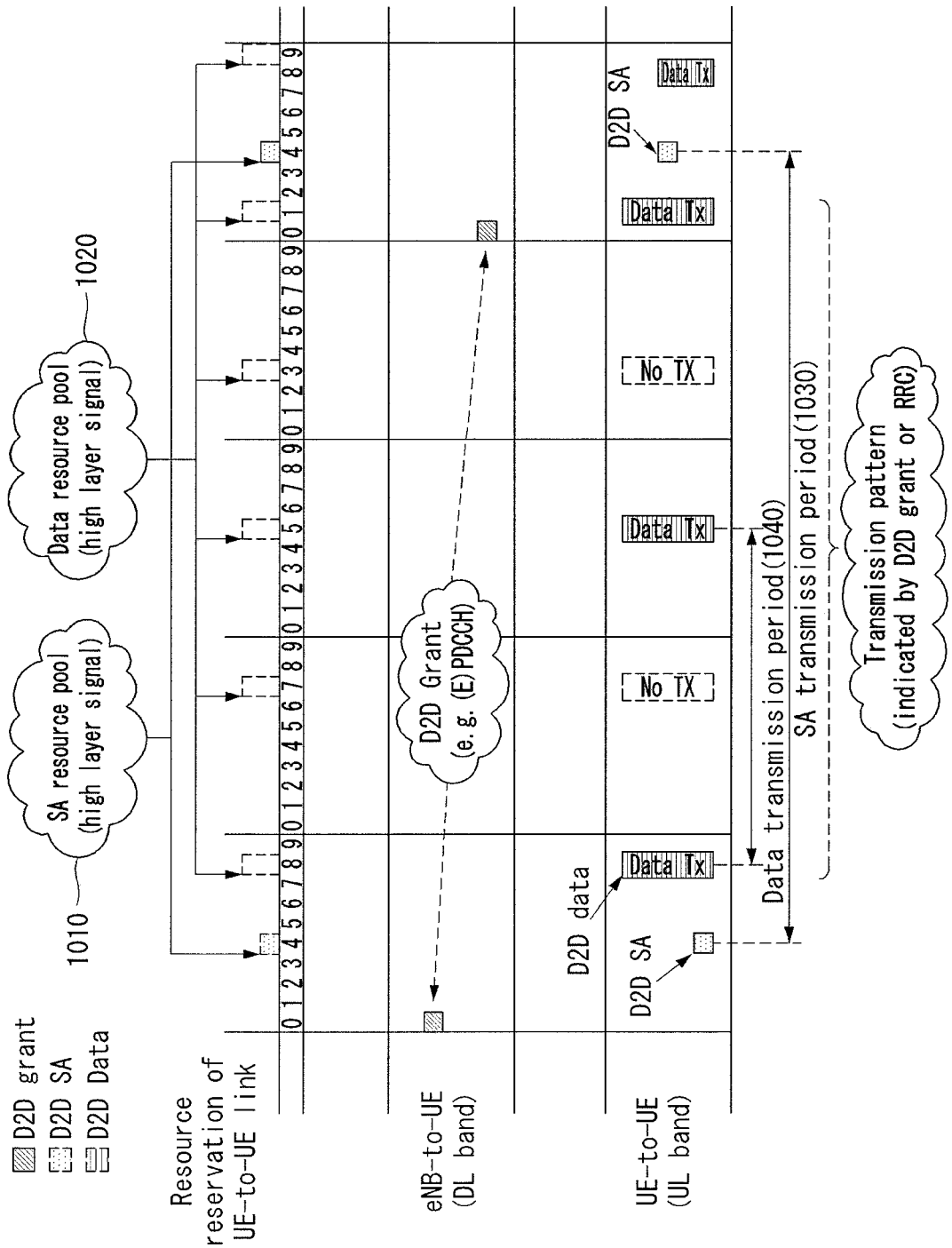

[Figure 11]
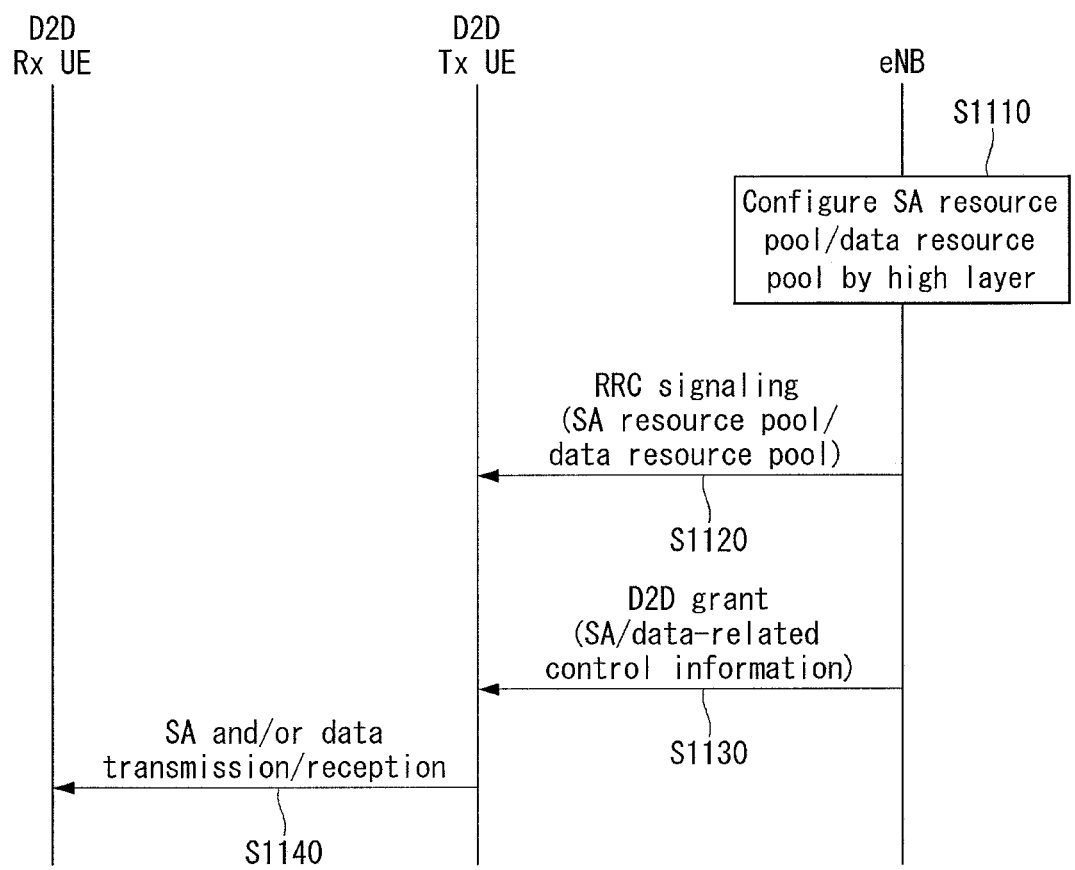

【Figure 12】
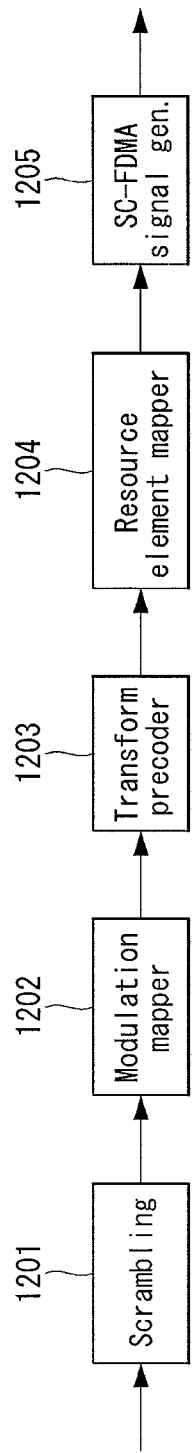

[Figure 13]
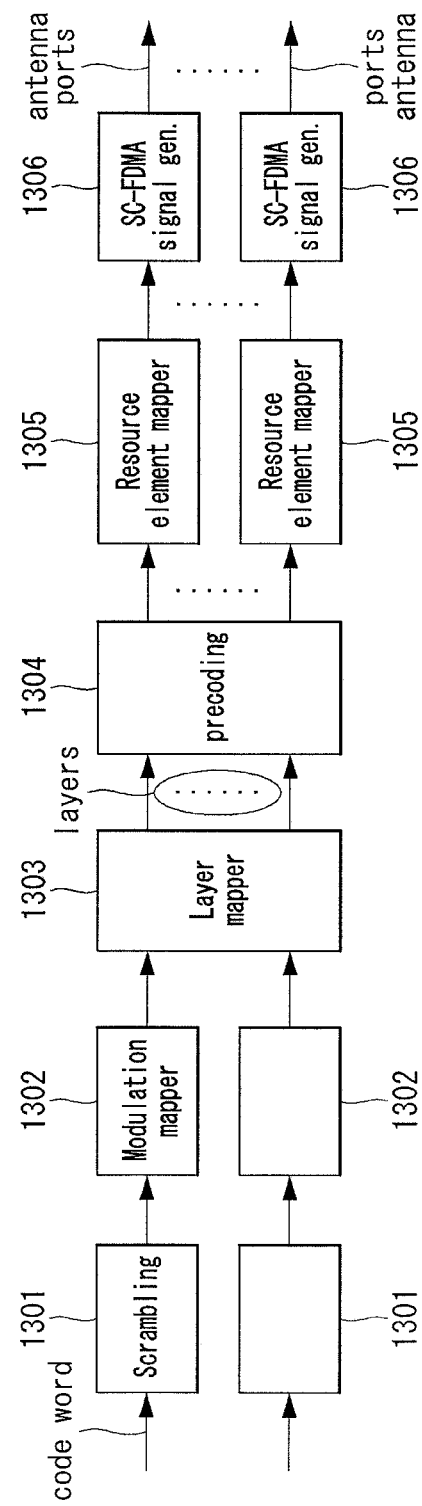

【Figure 14】
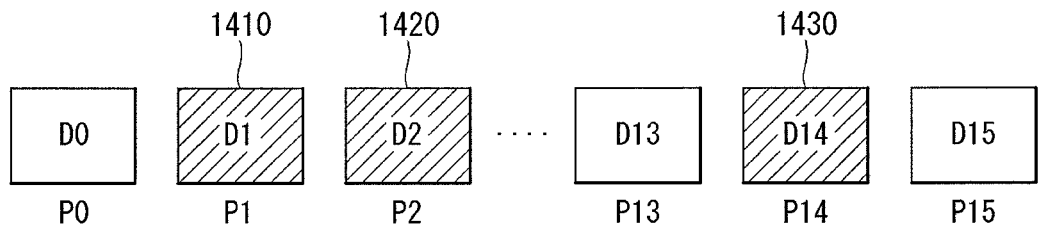
【Figure 15】
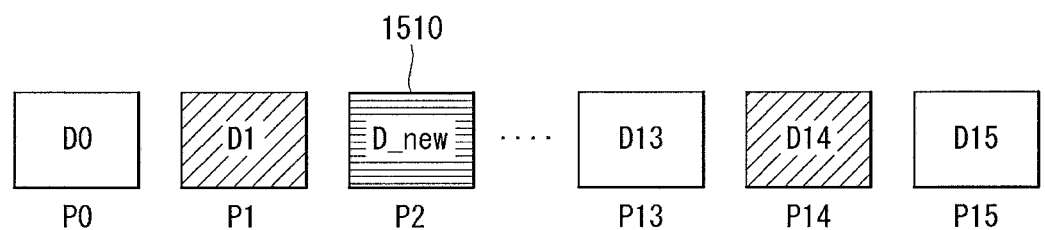
【Figure 16】
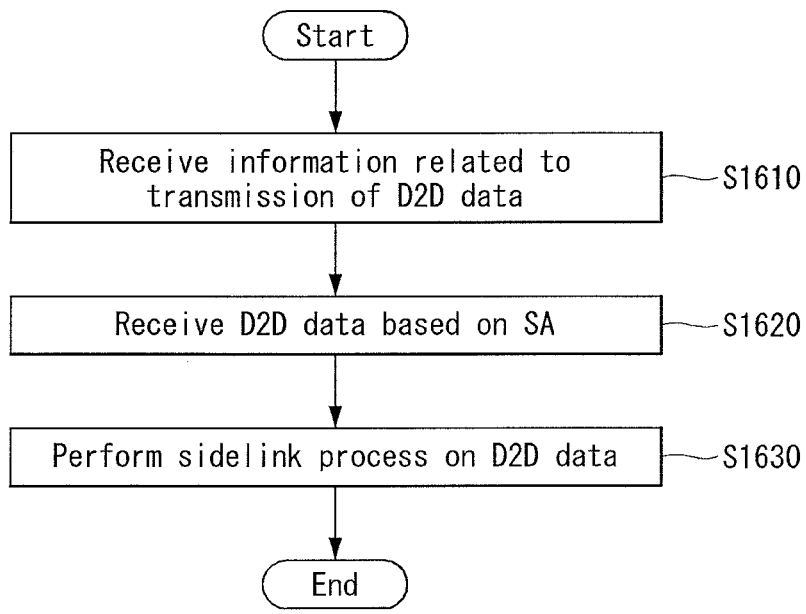

[Figure 17]
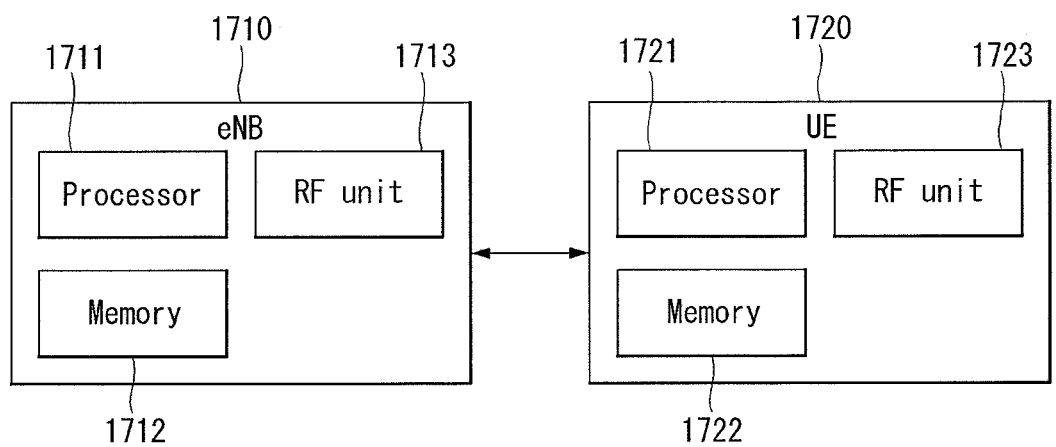

METHOD FOR PERFORMING DEVICE-TO-DEVICE COMMUNICATION IN WIRELESS COMMUNICATION SYSTEM, AND APPARATUS FOR SAME

CROSS REFERENCE TO RELATED APPLICATIONS

This application is the National Phase of PCT/KR2016/002677 filed on Mar. 17, 2016, which claims priority under 35 U.S.C. § 119(e) to U.S. Provisional Application No. 62/135,673 filed on Mar. 19, 2015, all of which are hereby expressly incorporated by reference into the present application.

TECHNICAL FIELD

The present invention relates to a wireless communication system and, more particularly, to a method for performing device-to-device (D2D) communication and an apparatus for supporting the same.

BACKGROUND ART

Mobile communication systems have been developed to provide voice services, while guaranteeing user activity. Service coverage of mobile communication systems, however, has extended even to data services in addition to voice services. Accordingly, an explosive increase in the traffic has recently resulted in the shortage of resources and user needs for high speed services, requiring advanced mobile communication systems.

The requirements of a next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of this specification is to provide a method of determining the priority of D2D data according to a specific criterion.

Furthermore, an object of this specification is to provide a method for transmitting/receiving priority determination-related information of D2D data using a sidelink physical channel.

Furthermore, an object of this specification is to provide a method for controlling a (D2D) sidelink process using priority determination-related information of D2D data.

Technical objects to be achieved by the present invention are not limited to the aforementioned objects, and those skilled in the art to which the present invention pertains may evidently understand other technological objects from the following description.

Technical Solution

In this specification, in a method of performing device-to-device (D2D) communication in a wireless communication system, the method performed by a D2D Rx UE includes the steps of receiving a scheduling assignment (SA) comprising information related to the transmission of D2D data through a sidelink physical channel from a D2D transmission (Tx) UE; receiving the D2D data from the D2D Tx UE based on the received SA; and performing a sidelink process on the received D2D data, wherein the D2D data has priorities.

Furthermore, in this specification, the priorities of the D2D data are identical or different.

Furthermore, in this specification, the information related to the transmission of D2D data includes control information related to the determination of the priorities of the D2D data.

Furthermore, in this specification, the control information includes at least one of a service type field indicative of a service type of the D2D data, a delay requirement field, a QoS requirement field, a UE capability field indicative of the type of a Tx UE, a data type field indicative of the type of the D2D data and an application category field.

Furthermore, in this specification, the method further includes the steps of receiving a reference signal related to the D2D data; measuring quality of a channel through the received reference signal; and determining the priorities of the D2D data based on the measured channel quality.

Furthermore, in this specification, if the priorities of the D2D data are different, a piece of specific priority information is received through the SA, and the piece of specific priority information is the highest or lowest priority information of the priorities of the D2D data received based on the SA.

Furthermore, in this specification, the SA includes a scheduling assignment identifier (SA ID), and the method further includes the step of determining the priorities of the D2D data the received based on the SA using the SA ID and specific operation.

Furthermore, in this specification, the step of performing the sidelink process includes the step of comparing the priority of new D2D data with the priority of D2D data related to the sidelink processes which are being used based on the control information if the received D2D data is the new D2D data and all of the sidelink processes are used.

Furthermore, in this specification, the method further includes the steps of selecting a specific sidelink process of the sidelink processes which are being used if, a result of the comparison, the priority of the new D2D data is higher than the priority of the D2D data related to the sidelink processes which are being used, and using the selected specific sidelink process for the new D2D data.

Furthermore, in this specification, the step of selecting the specific sidelink process includes selecting a sidelink process corresponding to D2D data belonging to the D2D data related to the sidelink processes which are being used and having the lowest priority or selecting a sidelink process corresponding to D2D data having priority lower than the priority of the new D2D data.

Furthermore, in this specification, the method further includes the step of selecting any one D2D datum according to a specific criterion if D2D data belonging to the D2D data related to the sidelink processes which are being used and having the lowest priority is plural or D2D data having priority lower than the priority of the new D2D data and related to the sidelink processes which are being used is plural.

Furthermore, in this specification, the step of selecting the one D2D datum according to the specific criterion includes randomly selecting the one D2D datum, selecting D2D data most recently subjected to the first transmission, selecting D2D data subjected to the oldest first transmission, selecting D2D data most retransmitted, or selecting D2D data least subjected to retransmission.

Furthermore, in this specification, in a method of performing device-to-device (D2D) communication in a wireless communication system, the method performed by a D2D Rx UE includes the steps of receiving priority determination-related information about a D2D-related signal; receiving the D2D-related signal from a D2D transmission (Tx) UE; and performing a sidelink process on the received D2D-related signal. If all of sidelink processes are used, a sidelink process corresponding to a D2D-related signal having lower priority than the received D2D-related signal is used for the received D2D-related signal based on the priority determination-related information.

Furthermore, in this specification, the D2D-related signal is a discovery signal, a communication signal or a synchronization signal.

Furthermore, in this specification, the priority of the synchronization signal is the highest, and the priority of the discovery signal is the lowest.

Furthermore, in this specification, in a D2D Rx UE performing device-to-device (D2D) communication in a wireless communication system, the D2D Rx UE includes a radio frequency (RF) unit for transmitting/receiving a radio signal and a processor functionally connected to the RF unit. The processor performs control so that a scheduling assignment (SA) comprising information related to the transmission of D2D data is received from a D2D transmission (Tx) UE, the D2D data is received from the D2D Tx UE based on the received SA, and a sidelink process is performed on the received D2D data. The D2D data has priorities.

Advantageous Effects

This specification has an effect in that urgent D2D data can be received earlier than other non-urgent D2D data based on the priority of D2D data if a sidelink process cannot be performed on new D2D data because all of D2D sidelink processes are used by a D2D Rx UE.

Effects which may be obtained by the present invention are not limited to the aforementioned effects, and various other effects may be evidently understood by those skilled in the art to which the present invention pertains from the following description.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 is a diagram for illustrating physical channels used in a 3GPP LTE/LTE-A system to which the present invention may be applied and a common signal transmission method using the same.

FIG. 3 shows the structure of a radio frame in a wireless communication system to which the present invention may be applied.

FIG. 4 is a diagram illustrating a resource grid for one downlink slot in a wireless communication system to which the present invention may be applied.

FIG. 5 shows the structure of a downlink subframe in a wireless communication system to which the present invention may be applied.

FIG. 6 shows the structure of an uplink subframe in a wireless communication system to which the present invention may be applied.

FIG. 7 is a diagram for conceptually illustrating D2D communication in a wireless communication system to which the present invention may be applied.

FIG. 8 shows examples of various scenarios of D2D communication to which a method proposed by this specification may be applied.

FIG. 9 is a diagram for illustrating a dispersive discovery resource allocation method in a wireless communication system to which the present invention may be applied.

FIG. 10 is a diagram for illustrating a method of transmitting/receiving signaling for D2D direct communication in a wireless communication system to which the present invention may be applied.

FIG. 11 is a diagram for illustrating a method of transmitting downlink control information for D2D direct communication in a wireless communication system to which the present invention may be applied.

FIG. 12 is a diagram for illustrating a signal processing process for transmitting, by a UE, an uplink signal.

FIG. 13 is a diagram for illustrating a signal processing process for transmitting, by an eNB, a downlink signal.

FIG. 14 is a diagram showing an example of a D2D sidelink process method to which a method proposed by this specification may be applied.

FIG. 15 is a diagram showing an example of an efficient method of managing a sidelink process, which is proposed by this specification.

FIG. 16 is a flowchart showing an example of a method for controlling a D2D sidelink process, which is proposed by this specification.

FIG. 17 illustrates a block configuration diagram of a wireless communication device to which the methods proposed by this specification may be applied.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some instances, known structures and devices may be omitted or shown in a block diagram form based on the core functions of the structures and devices in order to avoid making obscure the concept of the present invention.

In this specification, an enhanced Node B (eNode B or eNB) may be a terminal node of a network, which directly communicates with the terminal. In this document, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB.

The term 'eNB' may be replaced with a term 'fixed station', 'base station (BS)', 'Node B', 'base transceiver system (BTS),', 'access point (AP)', etc. The term 'user equipment (UE)' may be replaced with a term 'terminal', 'mobile station (MS)', 'user terminal (UT)', 'mobile subscriber station (MSS)', 'subscriber station (SS)', 'advanced mobile station (AMS)', 'wireless terminal (WT)', 'machine-type communication (MTC) device', 'machine-to-machine (M2M) device', 'device-to-device (D2D) device', wireless device, etc.

Hereinafter, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

The embodiments of the present invention may be supported by the standard documents disclosed in at least one of IEEE 802, 3GPP and 3GPP2, that is, wireless access systems. That is, steps or portions not described to clearly disclose the technological spirit of the present invention in the embodiments of the present invention may be supported by the documents. Furthermore, all the terms disclosed in this document may be described by the standard documents.

For clarity, this application focuses on the 3GPP LTE/LTE-A system. However, the technical features of the present invention are not limited thereto.

General System

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S201 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S202 step to obtain more specific system information.

Next, the UE may carry out a random access procedure such as the steps of S203 to S206 to complete a connection process to the eNB. To this purpose, the UE transmits a preamble S203 through a physical random access channel (PRACH) and receives a response message in response to the preamble through a PDSCH corresponding to the PRACH S204. In the case of contention-based random access, the UE may carry out a contention resolution procedure including transmission of an additional PRACH signal S205 and reception of a PDCCH signal and the PDSCH signal corresponding to the PDCCH signal S206.

Afterwards, the UE which has carried out the procedure above may carry out reception S207 of the PDCCH signal and/or PDSCH signal and transmission S208 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 3 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 3(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 3(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

The structure of the radio frame is just one example and the number subcarriers included in the radio frame or the number of slots included in the subframe and the number of OFDM symbols included in the slot may be variously changed.

FIG. 4 is a diagram illustrating a resource grid for one downlink slot in the wireless communication system to which the present invention can be applied.

Referring to FIG. 4, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 5 illustrates a structure of a downlink subframe in the wireless communication system to which the present invention can be applied.

Referring to FIG. 5, a maximum of three before OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (i.e., the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 6 illustrates a structure of an uplink subframe in the wireless communication system to which the present invention can be applied.

Referring to FIG. 6, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Device-to-Device (D2D) Communication

A Device-to-Device (D2D) communication technology refers to a method of directly communicating, by UEs closely located geographically, with each other without the intervention of infrastructure, such as an eNB.

Regarding the D2D communication technology, a technology chiefly using an unlicensed frequency bandwidth, such as Wi-Fi Direct and Bluetooth that have already been commercialized, has been developed. However, for the purpose of improving frequency use efficiency of a cellular system, the development and standardization of a D2D communication technology using a licensed frequency bandwidth are in progress.

In general, D2D communication is communication between things, but is limitedly used as a term that refers to thing intelligence communication. However, D2D communication in the present invention may include all of communications between various types of devices having a communication function, such as a smartphone or personal computer, in addition to a simple device having a communication function.

FIG. 7 is a diagram for schematically describing the D2D communication in a wireless communication system to which the present invention may be applied.

FIG. 7a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 7b illustrates a UE-to-UE communication scheme as an example of the D2D communication, and the data exchange between the UEs may be performed without passing through the base station.

The communication scheme may be referred to as a direct communication scheme between devices. The D2D direct communication scheme has advantages of reducing latency and using smaller wireless resources as compared with the existing indirect communication scheme through the base station.

FIG. 8 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 8a illustrates an example of an out-of-coverage network scenario of the D2D communication.

The out-of-coverage network scenario means perform the D2D communication between the D2D UEs without control of the base station.

In FIG. 8a, only the UE1 and the UE2 are present and the UE1 and the UE2 may directly communicate with each other.

FIG. 8b illustrates an example of a partial-coverage network scenario of the D2D communication.

The partial-coverage network scenario means performing the D2D communication between the D2D UE positioned in the network coverage and the D2D UE positioned out of the network coverage.

In FIG. 8b, it may be illustrated that the D2D UE positioned in the network coverage and the D2D UE positioned out of the network coverage communicate with each other.

FIG. 8c illustrates an example of the in-coverage-single-cell and FIG. 8d illustrates an example of the in-coverage-multi-cell scenario.

The in-coverage network scenario means that the D2D UEs perform the D2D communication through the control of the base station in the network coverage.

In FIG. 8c, the UE1 and the UE2 are positioned in the same network coverage (alternatively, cell) under the control of the base station.

In FIG. 8d, the UE1 and the UE2 are positioned in the network coverage, but positioned in different network coverage. In addition, the UE1 and the UE2 performs the D2D communication under the control of the base station managing the network coverage.

D2D communication will be described in detail below.

The D2D communication may operate in the scenario illustrated in FIG. 8, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur.

Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

(1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message.

The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

More specifically, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (i.e., the number of subframes constituted by the wireless resource pool). In the case of the in-coverage UE, the discovery resource pool for the discovery transmission is set by the eNB and may notified to the UE by using RRC signaling (e.g., a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be classified in one subframe unit, and in each subframe, each slot may include two physical resource blocks (PRBs). One discovery resource may be used for one UE to transmit a discovery MAC PDU.

Furthermore, a UE may repeatedly transmit a discovery signal within a discovery period in order to transmit one transport block. The transmission of an MAC PDU transmitted by one UE may be repeated (e.g., repeated four times) contiguously or non-contiguously in a discovery period (i.e., a wireless resource pool). The number of discovery signals transmitted for one transport block may be transmitted to a UE through high layer signaling.

The UE randomly selects the first discovery resource in the discovery resource set) which may be used for the repeated transmission of the MAC PDU, and other discovery resources may be determined in relation with the first discovery resource. For example, a predetermined pattern is preset and a next discovery resource may be determined according to a predetermined pattern depending on the position of the first selected discovery resource.

Further, a UE may randomly select each discovery resource in a discovery resource set which may be used for the repeated transmission of an MAC PDU.

In Type 2, the resource for the discovery message transmission is UE-specifically allocated.

Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

A wireless resource pool for discovery message reception is set by an eNB and a UE may be notified of the wireless resource pool using RRC signaling (e.g., a system information block (SIB)).

The discovery message reception UE monitors all of the discovery resource pools of Type 1 and Type 2 for the discovery message reception.

(2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (e.g., scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes Mode 1 and Mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of Mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the Mode 2 is applied.

In Mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (i.e., the PSSCH) transporting the D2D direct communication data.

(3) Synchronization

A D2D synchronization signal/sequence (D2DSS) may be used for a UE to obtain time-frequency synchronization. Particularly, in the case of out-of-coverage, since the control of the eNB is impossible, a new signal and procedure for synchronization establishment between UEs may be defined. A D2D synchronization signal may be called a sidelink synchronization signal.

A UE periodically transmitting a D2D synchronization signal may be referred to as a D2D synchronization source or a sidelink synchronization source. If a D2D synchronization source is an eNB, the structure of a transmitted D2D synchronization signal may be the same as that of a PSS/SSS. If a D2D synchronization source is not an eNB (e.g., a UE or global navigation satellite system (GNSS)), the structure of a transmitted D2D synchronization signal may be newly defined.

A D2D synchronization signal is periodically transmitted for a period of not less than 40 ms.

Each UE may have multiple physical-layer sidelink synchronization identities. The physical-layer sidelink synchronization identity may be called a physical-layer sidelink synchronization identity or simply a D2D synchronization identity.

The D2D synchronization signal includes a primary D2D synchronization signal/sequence and a secondary D2D synchronization signal/sequence. They may be called a primary sidelink synchronization signal (PSSS) and a secondary sidelink synchronization signal (SSSS), respectively.

A UE may first search for a D2D synchronization source before it transmits a D2D synchronization signal. In addition, when the D2D synchronization source is searched, the UE may obtain time-frequency synchronization through the D2D synchronization signal received from the searched D2D synchronization source. In addition, the corresponding UE may transmit the D2D synchronization signal.

Furthermore, a channel for transferring system information and synchronization-related information used for communication between UEs along with synchronization may be necessary. A channel for this purpose may be defined. Such a channel may be called a physical D2D synchronization channel (PD2DSCH) or a physical sidelink broadcast channel (PSBCH).

Hereinafter, for clarity, direct communication between two devices in D2D communication has been illustrated as being an example, but the scope of the present invention is not limited thereto, and the same principle described in the present invention may be applied even to D2D communication between a plurality of two or more devices.

D2D Discovery

Hereinafter, a signal (or message) periodically transmitted by a UE for D2D discovery may be called a discovery message, a discovery signal, a beacon or the like. The signal (or message) is hereinafter called a discovery message, for convenience of description.

In dispersive discovery, dedicated resources may be periodically allocated to a UE separately from cellular resources as resources for allowing a UE to transmit and receive a discovery message.

This is described below with reference to FIG. 9.

FIG. 9 is a diagram for illustrating a dispersive discovery resource allocation method in a wireless communication system to which the present invention may be applied.

Referring to FIG. 9, in a dispersive discovery method, a discovery subframe (i.e., a "discovery resource pool") 901 that belongs to all of cellular uplink frequency-time resources and that is for discovery is fixedly (or dedicatedly), and the remaining region includes an existing LTE uplink wide area network (WAN) subframe area 902. The discovery resource pool may include one or more subframes.

The discovery resource pool may be periodically allocated at a specific time interval (i.e., a "discovery period"). Furthermore, the discovery resource pool may be repeatedly configured within one discovery period.

FIG. 9 shows a case where a discovery resource pool is allocated in a discovery period of 10 sec and 64 contiguous subframes are allocated as discovery resource pools. However, the sizes of the time/frequency resources of the discovery period and discovery resource pool correspond to examples, and the present invention is not limited thereto.

A UE autonomously selects a resource (i.e., "discovery resource") for transmitting its discovery message within a discovery pool dedicatedly allocated thereto, and transmits the discovery message through the selected resource.

D2D Direct Communication

D2D control information may be called sidelink control information (SCI) or a scheduling assignment (SA). As described above, D2D control information may be transmitted on a PSCCH and D2D data may be transmitted on a PSSCH. D2D control information is hereinafter called an SA.

FIG. 10 is a diagram for illustrating a method of transmitting/receiving signaling for D2D direct communication in a wireless communication system to which the present invention may be applied.

FIG. 10 shows a D2D operation procedure in a D2D operation procedure (D2D communication Mode 1) through control of an eNB and a method of performing D2D communication by transmitting/receiving information related to the D2D operation procedure.

As shown in FIG. 10, a scheduling assignment (SA) resource pool 1010 and/or a data resource pool 1020 related to D2D communication may be configured. The previously configured resource pool may be transmitted from an eNB to D2D UEs through high layer signaling.

The high layer signaling may be RRC signaling.

The expression "A and/or B" used in this specification may be construed as being a concept that means at least one (A, B or A&B) of A and B.

The SA resource pool and/or the data resource pool mean a reserved resource for a D2D link or D2D communication.

The UE-to-UE link may be expressed as a sidelink.

Specifically, the SA resource pool means a resource region in which an SA can be transmitted, and the data resource pool means a resource region in which D2D data can be transmitted.

The SA may be transmitted in an SA period 1030, and D2D data may be transmitted in a data transmission period 1040.

The SA period and/or the data transmission period may be transmitted from an eNB to a D2D UE through a D2D grant.

Alternatively, the SA period may be transmitted through a D2D grant, and the data transmission period may be transmitted through an SA.

In this case, the D2D grant indicates an SA transmitted from the eNB to the D2D UE and downlink control information (DCI) necessary for D2D data transmission.

The D2D grant may be expressed as a DCI format 5 and may be transmitted through a physical layer channel or MAC layer channel, such as a PDCCH or an EPDCCH.

Furthermore, the D2D grant may include information related to data transmission in addition to information related to SA transmission.

The SA may include resource allocation (RA), MCS, a new data indicator (NDI) and a redundancy version (RV), for example.

As described above, the SA resource pool for SA transmission may be transmitted through RRC signaling.

Furthermore, the SA may be transmitted through a physical sidelink control channel (PSCCH), and the D2D data may be transmitted through a physical sidelink shared channel (PSSCH).

A D2D transmission (Tx) UE may receive SA information, specifically, resource allocation (RA) information (hereinafter called "SA RA" information) by which an SA may be transmitted through a D2D grant from an eNB.

In this case, the D2D Tx UE may transmit the SA RA information, received from the eNB, to a D2D reception (Rx) UE without any change or may generate new SA RA information with reference to the received SA RA information and transmit the newly generated SA RA information to the D2D Rx UE.

In this case, if the D2D Tx UE newly generates the SA RA, the D2D Tx UE needs to perform the resource allocation of an SA only within a resource region (resource pool) indicated by a D2D grant RA.

That is, this means that only some resource region (SA RA) of a resource region (D2D grant RA) that has been permitted to be used by the eNB may be selected and the SA may be transmitted.

Alternatively, the D2D Tx UE may use D2D grant RA allocated by the eNB without any change.

FIG. 11 is a diagram for illustrating a method of transmitting downlink control information for D2D direct communication in a wireless communication system to which the present invention may be applied.

First, an SA resource pool and/or D2D data resource pool related to D2D communication are configured by a high layer (S1110).

Thereafter, an eNB transmits the SA resource pool and/or the D2D data resource pool to a D2D Tx UE through high layer signaling (S1120).

Thereafter, the eNB transmits control information related to an SA and/or control information related to D2D data to the D2D Tx UE separately or together through a D2D grant (S1130).

The control information includes scheduling information of the SA and/or D2D data in the SA resource pool and/or D2D data resource pool. For example, the control information RA, an MCS, an NDI, an RV and so on.

Thereafter, the D2D Tx UE transmits the SA and/or the D2D data to a D2D Rx UE based on the information received at step S1130 (S1140).

The SA transmission and the D2D data transmission may be performed together or the D2D data transmission may be performed after the SA transmission.

Meanwhile, although not shown in FIG. 11, the D2D Tx UE may request a transmission resource (i.e., a PSSCH resource) for the D2D data from the eNB. The eNB may schedule a resource for the SA and D2D data transmission.

To this end, the D2D Tx UE may transmit a scheduling request (SR) to the eNB. Next, the eNB may perform a buffer status report (BSR) procedure so that the amount of resources requested by the D2D Tx UE can be determined.

In this case, the SR may be distinguished from an SR for a PUSCH resource request because it is an SR for requesting the allocation of the PSSCH resource other than a PUSCH resource.

To this end, in order to distinguish the SR for a PSSCH from the SR for a PUSCH, a combination of a PUCCH resource index (i.e., a PRB in which the SR is transmitted), a cyclic shift (CS) applied to a base sequence (e.g., a ZC sequence) for the frequency domain spreading of the SR, and orthogonal code (OC) for the time domain spreading of an SR may be differently configured.

D2D Rx UEs monitor a control information pool, and may selectively decode D2D data transmission related to corresponding control information when decoding control information related to a corresponding D2D Rx UE.

As described above, a D2D grant functions to allocate a resource necessary for a D2D Tx UE to transmit an SA and data and to transfer control information, that is, scheduling information such as an MCS.

Furthermore, from a viewpoint of a D2D Tx UE and a D2D Rx UE, since SCI is used for the scheduling of a PSSCH, a DCI format for a D2D grant proposed by the present invention is used for the scheduling of a PSCCH, and may include field information of the SCI.

The DCI format for the D2D grant (or sidelink grant) includes scheduling information for an SA and data, as described above, but a resource assignment/allocation (RA) field (or information) for an SA may be distinguished from a RA field (or information) for data.

For example, the DCI format for the D2D grant may include a frequency hopping flag (FH) field, a resource allocation (RA) field for a D2D SA, a first RA field for D2D data, a second RA field for D2D data, a TPC field and a zero padding (ZP) bit(s) (if present).

The FH field indicates whether frequency hopping is applied to when an SA and data are transmitted. The FH field may include one field because it may be applied to SA transmission and data transmission in common.

For example, if the value of the FH field is "1", a D2D Tx UE performs frequency hopping transmission when transmitting an SA and data. If the value of the FH field is "0", a D2D Tx UE does not perform frequency hopping transmission when transmitting an SA and data.

The SA RA field (or a PSCCH RA field or a resource field for a PSCCH) indicates resource information for SA transmission. That is, the SA RA field indicates scheduling information (i.e., resource information) for PSCCH transmission. Accordingly, a D2D Tx UE transmits an SA (i.e., PSCCH) in a resource indicated in an SA RA field.

In this case, the SA RA field may include time for SA transmission and/or information (or index) for deriving the location of a frequency resource region.

For example, the SA RA field may provide notification of the start location (i.e., index) of a resource for SA transmission. In other words, the SA RA field may indicate a subframe in which an SA is transmitted and/or the start index of a resource block.

Furthermore, a D2D Tx UE may derive a time resource (e.g., a subframe index) and/or a frequency resource (e.g., a resource block index) for SA transmission using a predetermined function (calculation equation) based on information included in the SA RA field.

Resource allocation information for D2D data transmission may include a D2D data first RA field (or a first PSSCH RA field or a resource block allocation and hopping resource allocation field), a D2D data second RA field (or a second PSSCH RA field or a time resource pattern field).

The D2D data first RA field indicates resource information (e.g., a resource block) for D2D data transmission in a frequency domain. That is, the D2D data first RA field indicates scheduling information for PSSCH transmission in the frequency domain. Accordingly, a D2D Tx UE transmits D2D data (i.e., a PSSCH) in a frequency resource indicated in the D2D data first RA field.

For example, the D2D data first RA field may indicate the start location (i.e., the start resource block index) of a resource block for D2D data transmission and the length of an allocated resource block using a resource indication value (RIV) as in an UL RA method.

Furthermore, the D2D data first RA field may separately provide notification of the start location (i.e., the start resource block index) and end location (i.e., the last resource block index) of a resource block for D2D data transmission using separate fields (or information). In this case, an additional bit (e.g., 1 bit) may be further necessary.

The D2D data second RA field indicates resource information (e.g., a subframe) used for D2D data transmission in the time domain. That is, the D2D data second RA field indicates scheduling information for PSSCH transmission in the time domain. Accordingly, the D2D Tx UE transmits D2D data (i.e., a PSSCH) in a time resource indicated in the D2D data second RA field.

For example, the D2D data second RA field may indicate a subframe pattern (i.e., time resources pattern) to be used for D2D data transmission. That is, the D2D data second RA field may include information indicative of a time resources pattern used for PSCCH transmission.

In this case, the D2D data second RA field may indicate any one of a plurality of predetermined time resources patterns. For example, n subframe patterns (expressed as bitmaps), such as an SF pattern #0(10001010), an SF pattern #1(00111001), . . . , an SF pattern #n(10011001), may be previously defined. The D2D data second RA field may indicate any one of the predetermined n subframe patterns. In this case, the value "1" in the bitmap means that D2D data is transmitted in a corresponding subframe, the value "0" may mean that D2D data is not transmitted in a corresponding subframe, and the vice versa.

The TPC field indicates transmission power for SA and data transmission by a D2D Tx UE. That is, the TPC field indicates transmission power information of a PSCCH and PSSCH.

The TPC field may include one field. If the TPC field includes one field as described above, the value of the TPC field is applied to transmission power for SA and data transmission in common.

ZP is filled with control information, if necessary, or may not be used or may not be present. That is, if ZP is not used, it may be omitted.

The sequence of the illustrate fields of the DCI format and the number of bits of each field are illustrative for convenience of description and may be changed.

Meanwhile, compared to the DCI format 0, the DCI format for the D2D grant may not include an MCS field.

If an eNB notifies a D2D Tx UE of an MCS value, the MCS field needs to be present in the DCI format for a D2D grant. However, an MCS value may be autonomously determined by a D2D Tx UE, may be transferred through high layer signaling (e.g., RRC signaling), or may be previously set as a fixed value. Accordingly, the MCS field may not be included in the D2D grant.

Furthermore, the DCI format for a D2D grant may not include an NDI field and an RV field. Likewise, the value of an NDI or RV may be autonomously determined by a D2D Tx UE, may be transferred through high layer signaling (e.g., RRC signaling), or may be previously set as a fixed value.

Uplink/Downlink Signal Processing Procedure

FIG. 12 is a diagram for illustrating a signal processing process for transmitting, by a UE, an uplink signal.

In order to transmit an uplink signal, the scrambling module 1201 of a user device may scramble the transmission signal using a user device-specific scrambling signal. The signal scrambled as described above is input to a modulation mapper 1202 and modulated into a complex symbol according to the BPSK, QPSK or 16 QAM method depending on the type and/or channel state of the transmission signal. Thereafter, the modulated complex symbol is spread by a transform precoder 1203 corresponding to DFT spread and input to a resource element (RE) mapper 1204. The RE mapper 1204 may map the complex symbol to a time-frequency resource element to be actually transmitted. The signal processed as described above may be transmitted to an eNB through an antenna via an SC-FDMA signal generator 1205.

FIG. 13 is a diagram for illustrating a signal processing process for transmitting, by an eNB, a downlink signal.

In a 3GPP LTE system, an eNB may transmit one or more codewords in downlink.

Accordingly, the one or more codeword may be processed as a complex symbol through a scrambling module 1301 and a modulation mapper 1302 as in uplink of FIG. 3. Thereafter, the complex symbol is mapped to a plurality of layers by a layer mapper 1303. Each layer may be multiplied by a specific precoding matrix selected according to a channel state by a precoding module 1304, and may be allocated to each transmission antenna. A transmission signal for each antenna processed as described above is mapped to a time-frequency resource element to be used for transmission by each resource element (RE) mapper 1305 and may be the transmitted through each antennal via each OFDM signal generator 1306.

A method for controlling D2D sidelink process proposed by this specification is described in detail with reference to drawings.

A D2D sidelink process may be simply expressed or called a "sidelink process."

A D2D sidelink process may include an operation when new D2D data is transmitted/received, an operation when retransmission D2D data is transmitted/received, and an operation when D2D data is decoded.

In an (LTE) D2D communication environment, a D2D reception UE (hereinafter expressed as a "D2D Rx UE") receives a D2D datum (data) from D2D transmission UEs (hereinafter expressed as "D2D Tx UEs").

As described above, a D2D datum(data) is transmitted/received between a D2D Tx UE and a D2D Rx UE through a physical sidelink shared channel (PSSCH).

Assuming that priority has been determined between D2D data, a maximum number of (D2D) sidelink processes that are now used is limited to 16.

Since the maximum number (=16) of (D2D) sidelink processes is limited as described above, there is a need for a method of controlling a D2D sidelink process based on the priority of D2D data.

Accordingly, this specification provides a method of controlling a D2D sidelink process all of which are being used when a D2D Rx UE receives new D2D data from a specific D2D Tx UE while all of the D2D sidelink processes are used by the D2D Rx UE.

Furthermore, this specification provides a method of controlling a D2D sidelink process when a D2D Rx UE receives a D2D-related signal, such as a discovery signal, a communication signal or a synchronization signal, from a D2D Tx UE while all of D2D sidelink processes are being used.

The method of controlling a D2D sidelink process proposed by this specification may be basically divided into (1) a method of determining the priority of D2D data, (2) a method of signaling priority (determination)-related information of D2D data, and (3) a method of selecting a D2D sidelink process for new D2D data.

Priority of D2D Data

First, a method of determining the priority of D2D data is described in detail.

In an (LTE) D2D communication environment, the priority of D2D data may be determined by various variables, such as a service type, a delay requirement, a QoS requirement, and a D2D Tx UE type.

The service type, delay requirement, QoS requirement and the D2D Tx UE type may correspond to absolute criteria for determining the priority of D2D data.

The service type may be set so that the properties of contents included in D2D data transmitted by a D2D Tx UE, such as "urgent" or "normal (or common)", are incorporated into the service type.

The delay requirement may be set depending on D2D data transmitted by a D2D Tx UE along with the service type. Accordingly, the delay requirement for D2D data corresponding to urgent information may be set small, and the delay requirement for D2D data corresponding to non-urgent information may be set large.

For another example, the QoS requirement may be set depending on D2D data transmitted by a D2D Tx UE. The QoS requirement for D2D data corresponding to urgent information may be set high, and the QoS requirement for D2D data corresponding to non-urgent information may be set low.

For another example, if the UE type of a D2D Tx UE is a D2D Tx UE of a type that performs a relay function, there is a high probability that information transmitted by the corresponding D2D Tx UE may be more (relatively) important than information transmitted by a D2D Tx UE of another UE type that does not perform a relay function.

Accordingly, the priority of D2D data transmitted by the D2D Tx UE of a UE type that performs a relay function may be set high.

The important information may be WAN DL/UL communication-related (system) information or accident/emergency alarm information, for example.

A method of determining the priority of D2D data according to a relative criterion is described below.

The priority of D2D data may be determined according to the absolute criteria (service type, delay/QoS requirement and UE type) as described above, but the priority of D2D data may be determined according to a relative criterion, such as a D2D data type or an application category.

For example, it is assumed that the type of D2D data includes a type A and a type B.

In this case, it may be said that in a common D2D Rx UE (e.g., a D2D Rx UE A), a D2D data type A has higher priority than a D2D data type B.

In a specific D2D Rx UE (e.g., a D2D Rx UE B), however, priority may not be assigned to the type A if the type A does not have the ability to process D2D data of the type A.

Furthermore, assuming that application categories A and B are present, it may be said that in a common D2D Rx UE (e.g., a D2D Rx UE A), the application category A has higher priority than the application category B.

In a specific D2D Rx UE (e.g., a D2D Rx UE B), however, if the application category A is not driven, the specific D2D Rx UE may not assign priority to the application category A.

For another example, in a method for a D2D Rx UE to directly determine the priority of D2D data, the priority of D2D data may be determined through a scheduling assignment (SA) depending on the quality of a received signal.

For example, if channel quality estimated through a reference signal (e.g., a DMRS or a CRS) is determined to be not good, a D2D Rx UE may assign relatively low priority compared to D2D data having good signal quality because it may be difficult for D2D data transmitted through a corresponding SA to be smoothly received.

In this case, a case where channel quality is not good may include a case where the distance between a D2D Tx UE and a D2D Rx UE is distant or a case where an obstacle is present between a D2D Tx UE and a D2D Rx UE.

Alternatively, the priority of D2D data according to the quality of a received signal may be applied to only SA/data transmission in which the quality of the received signal is a specific level or more.

In this case, if the quality of a received signal is low, priority equal to or lower than the priority of other D2D data may be assigned to D2D data although it is a type having high priority in other criteria.

Signaling Methods for Prioritization

The signaling of priority (determination)-related information of D2D data is described below.

The aforementioned priority (determination)-related information (the service type, delay requirement, quality of service (QoS) requirement, Tx UE type, D2D data type and application category) of D2D data may be directly transmitted from a D2D Tx UE to a D2D Rx UE.

For example, the priority-related information may be transmitted through a (new) field on a predetermined channel (e.g., an SA or a PSCCH) transmitted from a D2D Tx UE to a D2D Rx UE.

Alternatively, the priority (determination)-related information may be transmitted through a (new) field of a corresponding use defined on a D2D MAC control element (CE).

In addition, D2D data having priority of the same level may be transmitted through one scheduling assignment (SA) or D2D data having priorities of different levels may be transmitted through one SA.

In this case, if D2D data having priorities of different levels is transmitted through one SA, one priority that belongs to the priorities of different levels and that has a representation through a method previously agreed (predetermined) between D2D UEs or mixed priority information may be directly transmitted from a D2D Tx UE to a D2D Rx UE.

The method previously agreed (predetermined) between D2D UEs is described below.

First, there is a method of transmitting the lowest priority of priorities of D2D data through an SA.

In this method, a D2D Rx UE may be aware of the lowest priority of D2D data transmitted through a corresponding SA. It may be determined that D2D data having priorities lower than the lowest priority is not transmitted.

It is assumed that D2D data transmitted through a corresponding SA have priorities B, C, F and I.

In this case, assuming that the priorities are lower in order of the alphabetical letters, the priority of A is the highest and the priority of Z is the lowest.

In this case, priority actually transmitted from a D2D Tx UE to a D2D Rx UE through an SA becomes "I" and a D2D Rx UE may determine that D2D data having priorities lower than the priority "I" is not transmitted.

Second, there is a method of transmitting the highest priority of priorities of D2D data transmitted through a corresponding SA.

A D2D Rx UE may be aware of the highest priority of D2D data transmitted through a corresponding SA and D2D data having priority higher than the highest priority is not transmitted.

In this case, assuming that the priorities of D2D data transmitted through a corresponding SA are B, C, F and I (the priorities become lower in order of the alphabetical letters: A is the highest priority and Z is the lowest priority), priority actually transmitted from a D2D Tx UE to a D2D Rx UE through an SA becomes "B" and a D2D Rx UE may determine that D2D data having priority higher than the priority "B" is not transmitted.

The method of transmitting mixed priority information is described.

The method capable of transmitting mixed priority information means a method of transmitting priorities of different levels through one SA.

In this case, the mixed priority information may be transmitted through a (new) field on a predetermined channel (e.g., an SA or a PSCCH).

For another example, a specific function A known to D2D UEs may be used.

That is, assuming that a specific function A known to D2D UEs has been defined, the priority of D2D data to be transmitted is inserted into a D2D subframe that may be aware through a corresponding SA through the input of the specific function A.

Accordingly, output can be obtained through operation determined (previously known) based on an SA ID.

The output has a new SA ID (e.g., a mixed SA ID) having the same length as an existing SA ID.

In this case, the SA ID may be derived from a D2D Rx group ID.

In this case, if a D2D Tx UE transmits the new SA ID to a D2D Rx UE through an SA, the D2D Rx UE may determine whether it has an interest in D2D data to be transmitted in a D2D subframe that may be aware through the corresponding SA by checking the received new SA ID.

Specifically, when a D2D Rx UE receives a corresponding SA, it may find out the priority of corresponding D2D data from a new SA ID through the inverse function $A^{-1}$ of a specific function A.

Accordingly, a D2D Rx UE can match the priority of D2D data transmitted according to a previously agreed sequence (or location).

Selection Methods on Sidelink Process

A method of selecting a specific D2D sidelink process of D2D sidelink process is described below.

The corresponding method is a method of selecting any one of sidelink processes that are being used for new D2D data if all of the sidelink processes are used in a D2D Rx UE.

That is, when all of the D2D sidelink processes are used in the D2D Rx UE, if the D2D Rx UE receives new D2D data from a D2D Tx UE, it checks whether the priority of the received new D2D data is higher or lower than the lowest priority of D2D data of existing D2D data.

If, as a result of the check, the priority of the new D2D data is higher than the lowest priority of the D2D data of the existing D2D data, the D2D Rx UE selects any one of existing sidelink processes.

Thereafter, the D2D Rx UE configures the selected sidelink process so that it is used for the new D2D data.

Hereinafter, more detailed methods (Method 1 and Method 2) for selecting any one of existing sidelink process that are being used for a sidelink process for new D2D data are described below.

(Method 1): if D2D data that belongs to existing D2D data and that has the lowest priority is one, a sidelink process used for the corresponding D2D data may be configured to be used for new D2D data.

If D2D data that belongs to existing D2D data and that has the lowest priority is plural, however, a D2D Rx UE may select one of the D2D data having the lowest priority and configure a sidelink process used for the selected D2D data so that it is used for new D2D data.

FIG. 14 is a diagram showing an example of a D2D sidelink process method to which a method proposed by this specification may be applied.

FIG. 14 shows an example in which D2D data belonging to the existing D2D data of a D2D Rx UE and having the lowest priority is plural.

In FIG. 14, deviant crease line portions 1410, 1420 and 1430 indicate sidelink processes P1, P2 and P14 for D2D data D1, D2 and D14 having the lowest priority.

As shown in FIG. 14, the D2D data D1, D2 and D14 having the lowest priority is first selected from 16 sidelink processes P0-P15.

Furthermore, the D2D datum D2 of the selected D2D data may be selected through various methods, and the various methods are described later.

FIG. 15 is a diagram showing an example of an efficient method of managing a sidelink process, which is proposed by this specification.

Referring to FIG. 15, a sidelink process P2 1510 corresponding to D2 and used for D2D data may be configured to be used for new D2D data D_new.

Detailed methods of selecting a sidelink process to be used for new D2D data may be the following 1) to 5) methods.

1) Method of randomly selecting one sidelink process.

In this method, one of existing D2D data having the lowest priority is randomly selected, and a sidelink process used for corresponding D2D data is configured to be used for new D2D data.

2) Method of selecting a sidelink process corresponding to D2D data that has received first transmission from a D2D Tx UE most recently.

In the corresponding method, D2D data that belongs to existing D2D data having the lowest priority and that has received first transmission most recently is selected. A sidelink process used for the selected D2D data is configured to be used for new D2D data.

3) Method of selecting D2D data that has been subjected to the oldest first transmission by a D2D Tx UE.

In the corresponding method, D2D data that belongs to existing D2D data having the lowest priority and has been subjected to the oldest first transmission is selected, and a sidelink process used for the selected D2D data is configured to be used for new D2D data.

4) Method of selecting D2D data that has been most retransmitted by a D2D Tx UE.

In the corresponding method, D2D data that belongs to existing D2D data having the lowest priority and that has been most retransmitted is selected, and a sidelink process used for the selected D2D data is configured to be used for new D2D data.

5) Method of selecting D2D data that has been least retransmitted by a D2D Tx UE.

In the corresponding method, D2D data that belongs to existing D2D data having the lowest priority and that has been least retransmitted is selected, and a sidelink process used for the selected D2D data is configured to be used for new D2D data.

In addition, any one of existing D2D data having the lowest priority may be selected using various methods, and a sidelink process used for the corresponding D2D data may be configured to be used for new D2D data.

(Method 2): Method of selecting any one of existing D2D data having priorities lower than the priority of new D2D data and configuring a sidelink process used for the corresponding D2D data so that it is used for new D2D data.

As shown in FIG. 14, the existing D2D data D1, D2 and D14 having lower priority than the priority of the new D2D data in the 16 sidelink processes P0 P15 is selected. The D2D data D2 of the selected D2D data may be selected through the aforementioned various methods 1) to 5).

As shown in FIG. 15, a sidelink process used for the D2D data P2 selected through the various methods 1) to 5) may be configured to be used for the new D2D data D_new.

As in the methods 1) to 5) in Method 1, the methods 1) to 5) may be identically applied even in Method 2.

For a difference with the methods applied in Method 1, detailed methods of selecting a sidelink process to be sued for the new D2D data in Method 2 are indicated by 1') to 5').

1') One of existing D2D data having priorities lower than the priority of new D2D data may be randomly selected, and a sidelink process used for the selected D2D data may be configured to be used for the new D2D data.

This method is the most common method and has an advantage in that it is simple compared to other methods, but may not be efficient in terms of signal quality and throughput because D2D data is selected regardless of the number of retransmissions of existing D2D data transmitted/received using a sidelink process or the first transmission time.

2') D2D data that belongs to existing D2D data having priorities lower than the priority of new D2D data and that has been most recently subjected to the first transmission may be selected, and a sidelink process used for the selected D2D data may be configured to be used for the new D2D data.

The method in which the first transmission time is taken into consideration as described above has an advantage in terms of throughput, but may not be efficient in terms of the quality of a received signal because the number of retransmissions of each D2D datum has not been taken into consideration.

3') D2D data that belongs to existing D2D data having priorities lower than the priority of new D2D data and that has been subjected to the oldest first transmission may be selected, and a sidelink process used for the corresponding D2D data may be configured to be used for the new D2D data.

4') D2D data that belongs to existing D2D data having priorities lower than the priority of new D2D data and that has been most retransmitted may be selected, and a sidelink process used for the corresponding D2D data may be configured to be used for the new D2D data.

5') D2D data that belongs to existing D2D data having priorities lower than the priority of new D2D data and that has been least retransmitted may be selected, and a sidelink process used for the corresponding D2D data may be configured to be used for the new D2D data.

The method in which the number of retransmissions is taken into consideration as described above may be efficient in terms of signal quality, but may not be efficient in terms of total throughput.

In addition to 1') to 5'), one of existing D2D data having priorities lower than the priority of new D2D data may be selected using various methods, and a sidelink process used for the corresponding D2D data may be configured to be used for the new D2D data.

Unlike in the aforementioned methods, when all of sidelink processes are used in a D2D Rx UE, the D2D Rx UE may be configured to not receive new D2D data if the priority of the new D2D data received from a D2D Tx UE is lower or smaller than the lowest priority of D2D data of existing D2D data.

Apply Prioritization to D2D-Related Signal

As another embodiment proposed by this specification, the aforementioned prioritization concept may be applied to D2D-related signals.

D2D-related signal described in this specification includes a discovery signal, a communication signal and a synchronization signal.

That is, in an LTE D2D environment, a D2D Rx UE receives a discovery signal, a communication signal and a synchronized signal, that is, D2D-related signal, from a D2D Tx UE.

In this case, the D2D Rx UE may assign the highest priority to the synchronization signal and assign the lowest priority to the discovery signal.

Accordingly, when all of D2D sidelink processes are used, if a synchronization signal is received from the D2D Tx UE, the D2D Rx UE may be configured to select one of the existing sidelink processes that are being used using one of the aforementioned methods (1) to 5) and 1') to 5')) and to use the selected sidelink process for the synchronization signal.

Furthermore, when the D2D Rx UE receives a communication signal from the D2D Tx UE, it may be configured to select one of sidelink processes configured to be used for a discovery signal using one of the aforementioned methods (1) to 5) and 1') to 5')) and to use the selected sidelink process for the communication signal.

If the D2D Rx UE cannot perform a sidelink process for a discovery signal, it may be configured to select one of sidelink processes other than sidelink processes for synchronized signals using one of the aforementioned methods (1) to 5) and 1') to 5')) and to use the selected sidelink process for a communication signal.

Finally, when all of D2D sidelink processes are used, the D2D Rx UE may be configured to not receive a discovery signal from the D2D Tx UE.

FIG. 16 is a flowchart showing an example of a method for controlling a D2D sidelink process, which is proposed by this specification.

First, a D2D Rx UE receives a scheduling assignment (SA), including information related to the transmission of D2D data, from a D2D Tx UE through a sidelink physical channel (S1610).

The sidelink physical channel may be a physical sidelink control channel (PSCCH).

The D2D data may have priorities, and the priorities of the D2D data are the same.

Furthermore, the information related to the transmission of D2D data may include control information related to the determination of the priorities of the D2D data.

As described above, the priorities of the D2D data may be identical or different.

If the priorities of the D2D data are different, the D2D Rx UE may receive a piece of specific priority information through a scheduling assignment (SA).

The piece of specific priority information may be the highest or lowest priority information of the priorities of the D2D data received based on the scheduling assignment (SA).

In this case, the scheduling assignment (SA) may include a scheduling assignment identifier (SA ID).

In this case, the D2D Rx UE determines the priority of D2D data received based on the scheduling assignment (SA) using the SA ID and specific operation.

The control information may include at least one of a service type field indicative of a service type of the D2D data, a delay requirement field, a QoS requirement field, a UE capability field indicative of the type of a Tx UE, a data type field indicative of the type of D2D data and an application category field.

In this case, the D2D Rx UE may directly determine the priority of D2D data by receiving a reference signal related to the D2D data.

Specifically, the D2D Rx UE may measure the quality of a channel through the received reference signal and determine the priority of the D2D data based on the measured channel quality.

Thereafter, the D2D Rx UE receives D2D data from a D2D Tx UE based on the received scheduling assignment (SA) (S1620).

Thereafter, the D2D Rx UE performs a sidelink process on the received D2D data (S1630).

In this case, in order to perform the sidelink process, if the received D2D data is new D2D data and all of sidelink processes are being used, the D2D Rx UE may compare the priority of the new D2D data with the priorities of D2D data related to the sidelink processes that are being used based on the control information.

If, a result of the comparison, the priority of the new D2D data is found to be higher than the priorities of the D2D data related to the sidelink processes that are being used, the D2D Rx UE may be configured to select a specific sidelink process of the sidelink processes that are being used and to use the selected specific sidelink process for the new D2D data.

Furthermore, in order to select the specific sidelink process, the D2D Rx UE may select a sidelink process corresponding to D2D data that belongs to the D2D data related to the sidelink processes that are being used and that has the lowest priority or may select a sidelink process corresponding to D2D data that belongs to the D2D data related to the sidelink processes that are being used and has priority lower than the priority of the new D2D data.

In this case, if the D2D data that belongs to the D2D data related to the sidelink processes that are being used and that has the lowest priority is plural or the D2D data related to the sidelink process that has priority lower than the priority of the new D2D data and that is beings used is plural, the D2D Rx UE may select any one D2D datum according to a specific criterion.

In this case, what the one D2D datum is selected according to the specific criterion may include randomly selecting the one D2D datum, selecting D2D data that has been most recently subjected to the first transmission, selecting D2D data that has been subjected to the oldest first transmission, selecting D2D data that has been most retransmitted, or selecting D2D data that has been least subjected to retransmission.

General Device to which the Present Invention May be Applied

FIG. 17 illustrates a block configuration diagram of a wireless communication device to which the methods proposed by this specification may be applied.

Referring to FIG. 17, a wireless communication system includes an eNB 1710 and a plurality of UEs 1720 located within the range of the eNB 1710. In this case, the UE 1720 may correspond to the aforementioned UE, node, apparatus, RRH, relay, TP/RP, RSU, etc.

The eNB 1710 includes a processor 1711, memory 1712 and a radio frequency (RF) unit 1713. The processor 1711 implements the functions, processes and/or methods proposed by FIGS. 1 to 16. The layers of a radio interface protocol may be implemented by the processor 1711. The memory 1712 is connected to the processor 1711 and stores a variety of types of information for driving the processor 1711. The RF unit 1713 is connected to the processor 1711 and transmits and/or receives a radio signal.

The UE 1720 includes a processor 1721, memory 1722 and an RF unit 1723. The processor 1721 implements the functions, processes and/or methods proposed by FIGS. 1 to 16. The layers of a radio interface protocol may be implemented by the processor 1721. The memory 1722 is connected to the processor 1721 and stores a variety of types of information for driving the processor 1721. The RF unit 1723 is connected to the processor 1721 and transmits and/or receives a radio signal.

The memory 1712, 1722 may be located inside or outside the processor 1711, 1721 and connected to the processor 1711, 1721 by various well-known means. Furthermore, the eNB 1710 and/or the UE 1720 may have a single antenna or multiple antennas.

In the aforementioned embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. The sequence of the operations described in connection with the embodiments of the present invention may be changed. Some of elements or characteristics in an embodiment may be included in another embodiment or may be replaced with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the spirit and essential characteristics of the present invention. Accordingly, the detailed description should not be construed as being limited from all aspects, but should be considered to be illustrative. The range of right of the present invention should be determined by reasonable analysis of the attached claims, and all changes within the equivalent scope of the present invention are included in the range of right of the present invention.

INDUSTRIAL APPLICABILITY

In the wireless communication system of the present invention, the scheme for transmitting/receiving data has been illustrated as being applied to the 3GPP LTE/LTE-A systems, but may be applied to various wireless communication systems in addition to the 3GPP LTE/LTE-A system.

The invention claimed is:

1. A method of performing, by a device-to-device (D2D) reception (Rx) user equipment (UE), a D2D communication in a wireless communication system, the method comprising:

receiving, from a transmission (Tx) UE, a scheduling assignment (SA) ID for a priority of a D2D data, wherein the SA ID is generated by a predefined function based on a D2D Rx UE group ID;

obtaining the priority of the D2D data from the SA ID using an inverse function of the predefined function;

receiving, from the Tx UE, the D2D data;

comparing priorities of a plurality of previously received D2D data with the priority of the D2D data; and when the priority of the D2D data is higher than a lowest priority among the priorities of the plurality of previously received D2D data, and a plurality of resources for decoding the plurality of previously received D2D data are all in use:

a specific resource among the plurality of resources is replaced to be used for decoding the D2D data, the specific resource is a resource for decoding data having a smallest number of retransmission requests among the plurality of previously received D2D data.

2. The method of claim 1, wherein the priority of the D2D data is related with at least one of a service type of the D2D data, a delay requirement, a quality of service (QoS) requirement, a type of the D2D Tx UE, a type of the D2D data or an application category.

3. A device-to-device (D2D) reception (Rx) user equipment (UE) performing communication in a wireless communication system, comprising:

a transceiver configured to transmit and receive a radio signal; and a processor configured to control the transceiver, wherein the processor is configured to:

receive, from a transmission (Tx) UE, a scheduling assignment (SA) ID for a priority of a D2D data, wherein the SA ID is generated by a predefined function based on a D2D Rx UE group ID, obtain the priority of the D2D data from the SA ID using an inverse function of the predefined function, receive, from the Tx UE, the D2D data, compare priorities of a plurality of previously received D2D data with the priority of the D2D data, and when the priority of the D2D data is higher than a lowest priority among the priorities of the plurality of previously received D2D data, and a plurality of resources for decoding the plurality of previously received D2D data are all in use:

a specific resource among the plurality of resources is replaced to be used for decoding the D2D data, the specific resource is a resource for decoding data having a smallest number of retransmission requests among the plurality of previously received D2D data.

4. The D2D Rx UE of claim 3, wherein the priority of the D2D data is related with at least one of a service type of the D2D data, a delay requirement, a quality of service (QoS) requirement, a type of the D2D Tx UE, a type of the D2D data or an application category.

* * * * *